United States Patent
Zitting

(10) Patent No.: US 6,217,030 B1
(45) Date of Patent: Apr. 17, 2001

(54) SEAL ASSEMBLY

(76) Inventor: Richard D. Zitting, 2936 E. 1500 South, New Harmony, UT (US) 84757

(*) Notice: Subject to any disclaimer, the term of this patent is extended or adjusted under 35 U.S.C. 154(b) by 0 days.

(21) Appl. No.: 09/247,252

(22) Filed: Feb. 9, 1999

(51) Int. Cl.[7] .................................................. F16J 9/12
(52) U.S. Cl. ........................................... 277/435; 277/589
(58) Field of Search .................................... 277/434, 435, 277/447, 448, 589

(56) References Cited

U.S. PATENT DOCUMENTS

| | | | |
|---|---|---|---|
| 3,215,441 | * | 11/1965 | Horvereid . |
| 3,394,941 | * | 7/1968 | Traub . |
| 3,469,853 | * | 9/1969 | Gullick . |
| 3,630,532 | * | 12/1971 | Traub et al. . |
| 3,771,801 | * | 11/1973 | Burke . |
| 4,268,045 | * | 5/1981 | Traub . |
| 4,468,041 | * | 8/1984 | Yoshimura et al. . |
| 4,576,386 | * | 3/1986 | Benson et al. . |
| 5,467,689 | * | 11/1995 | Carlin et al. . |
| 5,524,905 | * | 6/1996 | Thoman et al. . |

* cited by examiner

Primary Examiner—Anthony Knight
Assistant Examiner—John L. Beres
(74) Attorney, Agent, or Firm—Lyon P.C.

(57) ABSTRACT

A seal for acceptance in an annular gland in a piston comprises an annular primary sealing element, an annular secondary sealing element disposed radially inwardly of the primary sealing element, and a pair of axially spaced back up rings disposed in axially spaced relation on opposite sides of the primary sealing element and having radially inner portions, respectively, engaged with the primary sealing element so as to lock the backup rings in the gland of the piston.

3 Claims, 3 Drawing Sheets

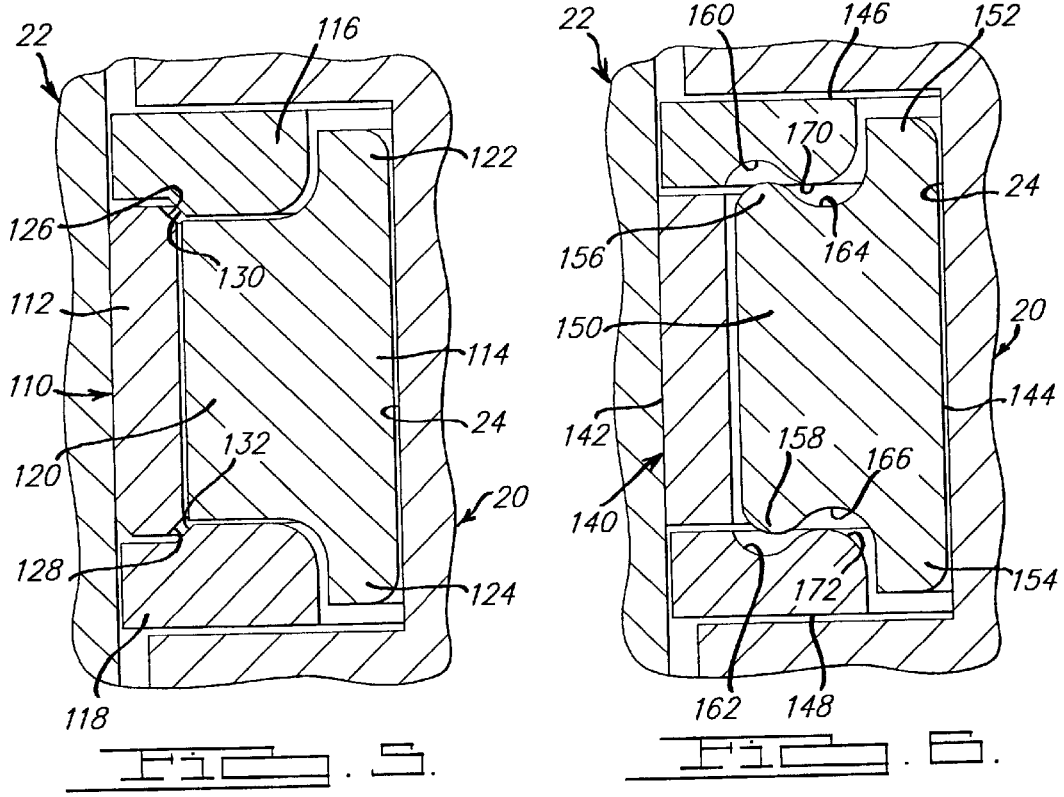
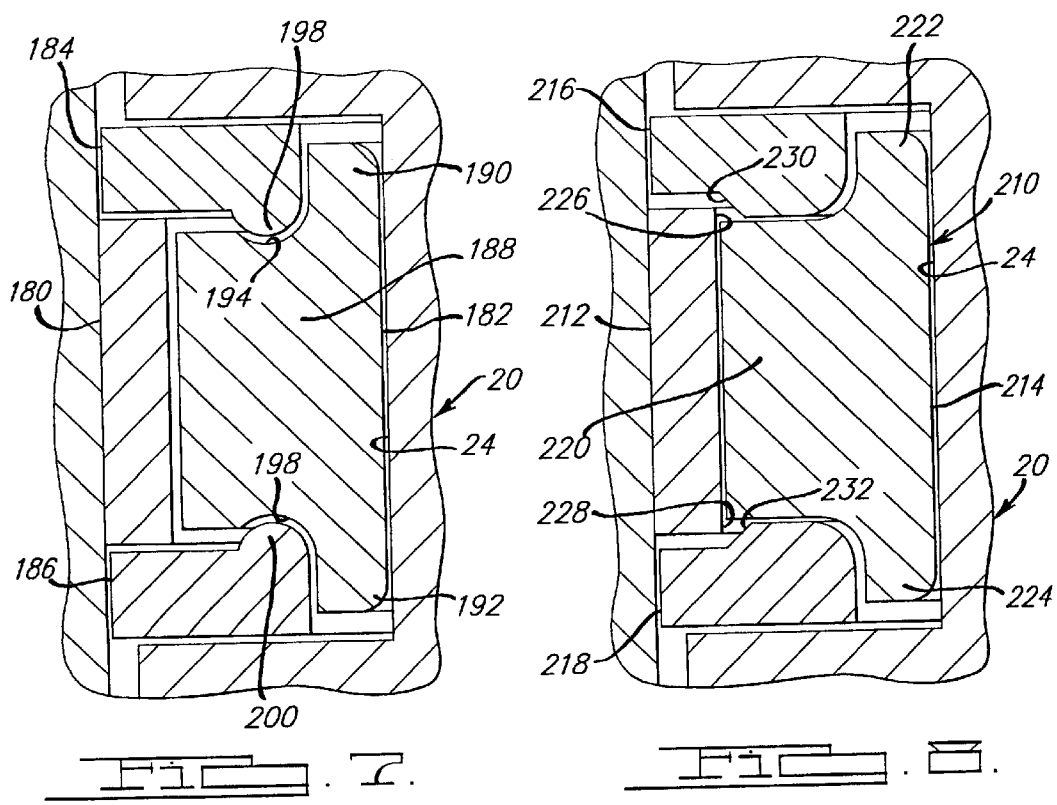

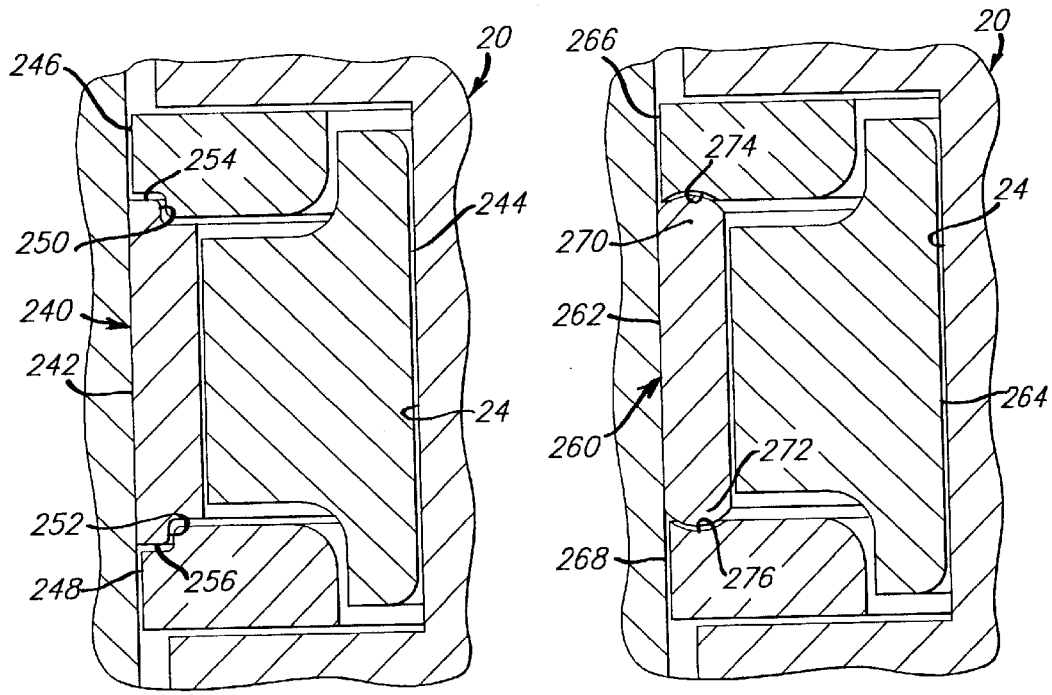
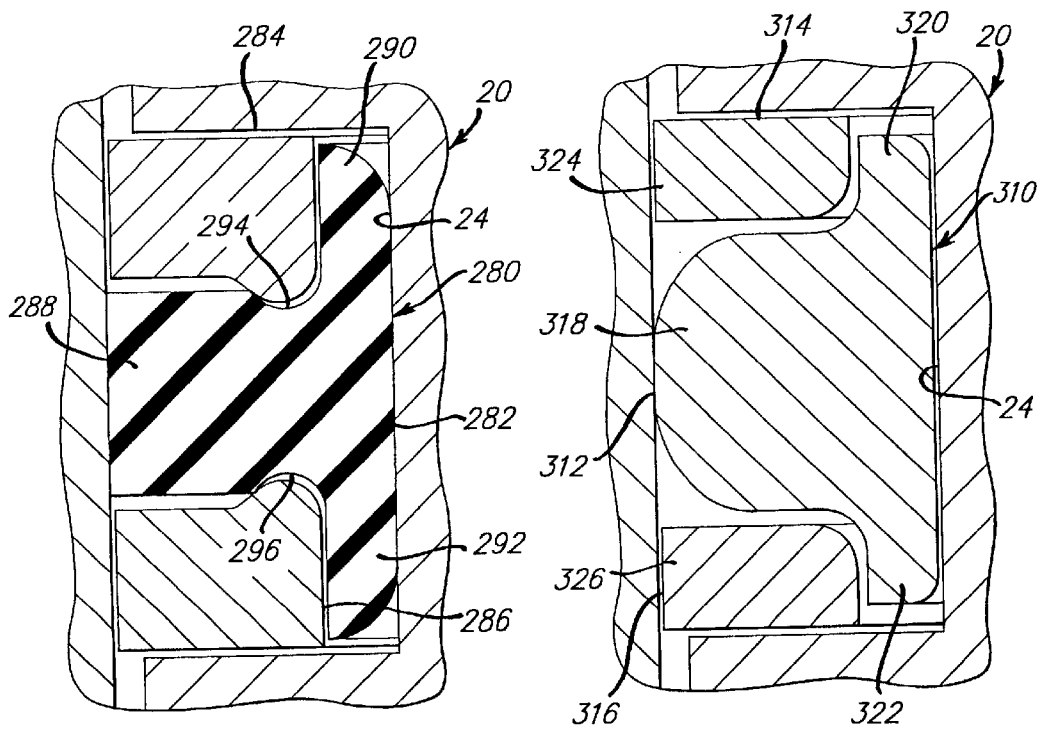

SEAL ASSEMBLY

BACKGROUND OF THE INVENTION

The piston of a hydraulic actuator is generally provided with a seal assembly to prevent leakage of hydraulic fluid past the piston. Such seal assemblies often comprise a relatively hard primary or dynamic sealing ring that is backed up by a relatively softer secondary or static sealing ring. Moreover, such seal assemblies are often provided with back up rings made of relatively hard material, for example, polyamide.

However, a problem exists in that known back up rings are often displaced incident to assembly of the piston into the cylinder bore. The back up rings may be forced out of the piston gland upon assembly with a cylinder or may fall out of the piston gland before the piston is telescoped into the cylinder. Moreover, known back up rings are susceptible of improper installation in the piston gland.

The aforesaid problems are solved, in accordance with a preferred constructed embodiment of the present invention, by providing a mechanical interlock between either the primary or secondary piston sealing ring and the back up rings. Stated in another manner, a locking arrangement between the back up rings and seal elements in the form of a mechanical interface between the back up rings and one or more sealing elements of the piston ring assembly precludes inadvertent disassembly as well as improper installation of the back up rings. The locking feature can be arranged to provide similar benefits in bi-directional and uni-directional rod seal assemblies.

BRIEF DESCRIPTION OF THE DRAWINGS

FIG. 5 a cross sectional view, similar to FIG. 2, of another embodiment of the invention.

FIG. 6 a cross sectional view, similar to FIG. 2, of another embodiment of the invention.

FIG. 7 is a cross sectional view, similar to FIG. 2, of another embodiment of the invention.

FIG. 8 is a cross sectional view, similar to FIG. 2, of another embodiment of the invention.

FIG. 9 is a cross sectional view, similar to FIG. 2, of another embodiment of the invention.

FIG. 10 is a cross sectional view, similar to FIG. 2, of another embodiment of the invention.

FIG. 11 is a cross sectional view, similar to FIG. 2, of another embodiment of the invention, and FIG. 12 is a cross sectional view, similar to FIG. 2 of yet another embodiment of the invention.

DETAILED DESCRIPTION OF THE PREFERRED EMBODIMENT(S)

Figure 1:
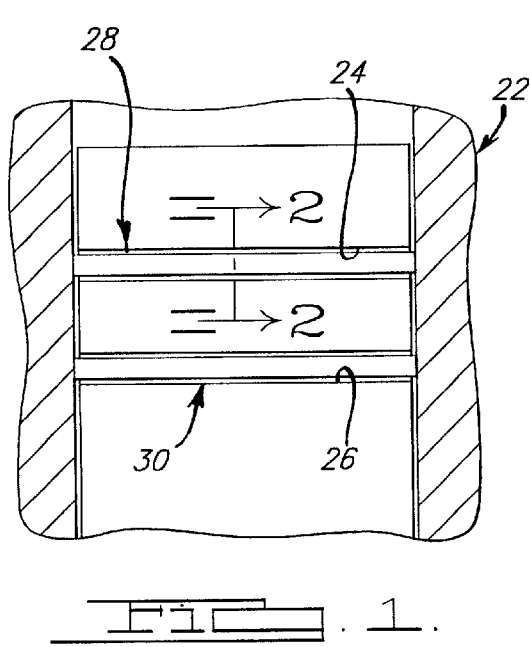
FIG. 1 across sectional view of a hydraulic cylinder having a piston provided with al assembly of the present invention.

As seen in FIG. 1, a piston 20 is slideably accepted in a cylinder 22. The piston 20 is provided with glands 24 and 26 for the acceptance seal assemblies 28 and 30 respectively.

Figure 2:
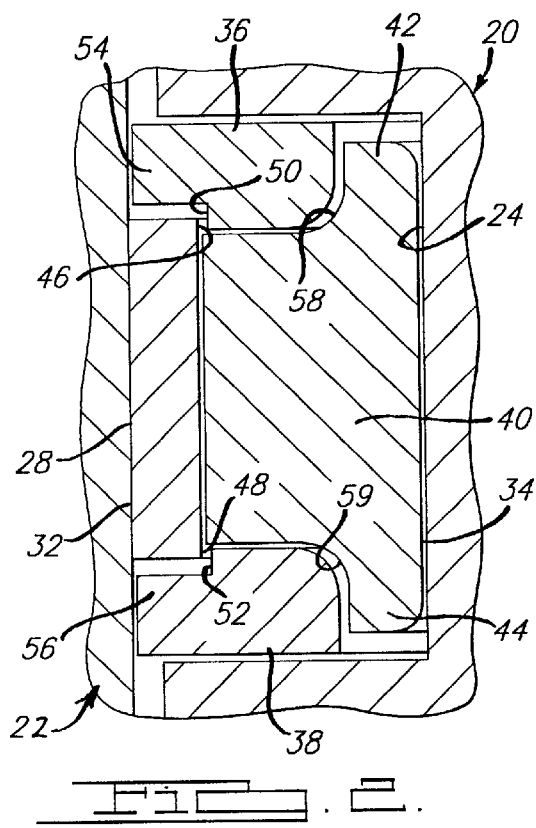
FIG. 2 is a cross sectional view taken along the line 2—2 of FIG. 1.

In accordance with a preferred embodiment of the instant invention, and as seen in FIG. 2, the seal assembly 28 comprises a dynamic or primary sealing element 32 having a durometer of 90 on the Rockwell "M" scale, a static or secondary sealing element 34 having a durometer of 70 on the Shore "A" scale, and a pair of back up rings 36 and 38 having durometer of 120 on the Rockwell "M" scale.

The secondary sealing element 34 is of T-shaped cross section defined by a stem portion 40 and axially oppositely extending flange portions 42 and 44. The primary sealing element 32 has an axial length that is greater than the axial length of the stem portion 40 of the secondary sealing element 34 thereby to define a pair of locking shoulders 46 and 48 which cooperate with shoulders 50 and 52 on the back up rings 36 and 38, respectively, to lock the back up rings 36 and 38 in the gland 24 of the piston 20. Reverse assembly of the back up rings 36 and 38 is precluded by the relatively larger axial thickness of the radially inner portion thereof which will not pass the primary sealing element 32 if incorrect assembly is attempted. Moreover, the square corners 54 and 56 on the back up rings 36 and 38 would interfere with arcuate sections 58 and 59 on the static secondary seal 34 if incorrect assembly is attempted.

Figure 3:
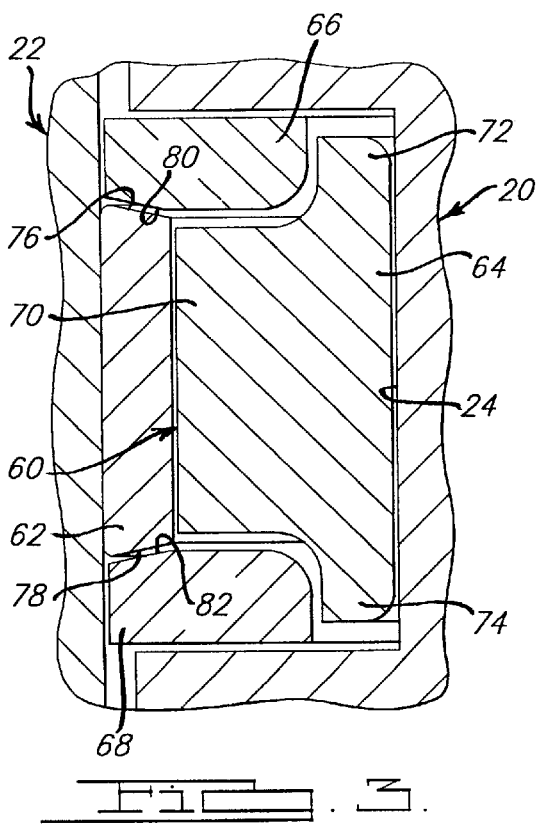
FIG. 3 cross sectional view, similar to FIG. 2, of another embodiment of the invention.

In accordance with another embodiment of the instant invention, and as seen in FIG. 3, a seal assembly 60 comprises a dynamic primary sealing element 62, a static secondary sealing element 64, and a pair of back up rings 66 and 68.

The secondary sealing element 64 is of T-shaped cross section defined by a stem portion 70 and axially oppositely extending flange portions 72 and 74. The primary sealing element 62 has an axial length on the radially outer surface thereof that is greater then the axial length of the radially inner surface thereof thereby to define a pair of angular locking surfaces 76 and 78 which cooperate with complimentary angular surfaces 80 and 82 on the back up rings 66 and 68, respectively, to lock the back up rings 66 and 68 in gland 24 of the piston 20.

Figure 4:
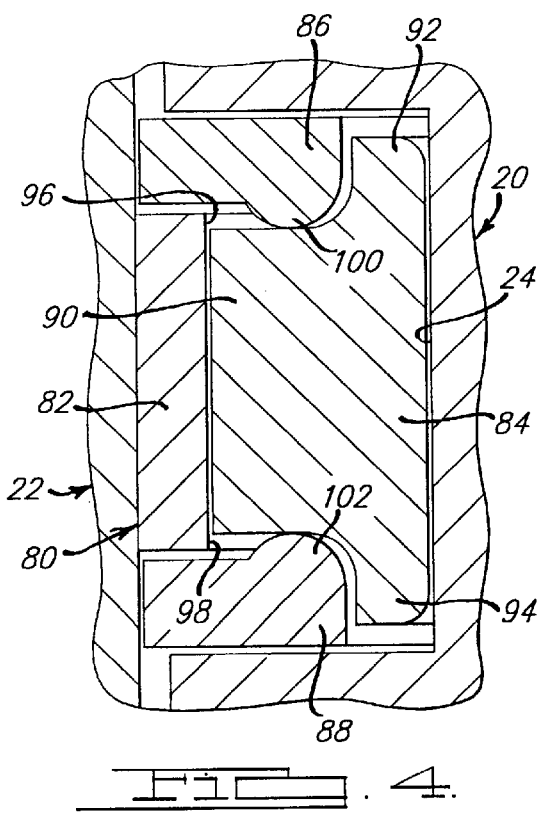
FIG. 4 is a cross sectional view, similar to FIG. 2, of another embodiment of the invention.

In accordance with another embodiment of the instant invention, and as seen in FIG. 4, a seal assembly 80 comprises a dynamic primary sealing element 82, a static secondary sealing element 84, and a pair of back up rings 86 and 88. The secondary sealing element 84 is of T-shaped cross section defined by a stem portion 90 and axially oppositely extending flange portions 92 and 94. The primary sealing element 82 has an axial length that is greater than the axial length of the stem portion 90 of the secondary sealing element 84 thereby to define a pair of locking shoulders 96 and 98 which cooperate with accurate shoulders 100 and 102 on the back up rings 86 and 88 respectively, to lock the back up rings 86 and 88 in the gland 24 of the piston 20. It is to be noted that the shoulders 100 and 102 preclude reverse installation of the back up rings 86 and 88.

In accordance with the embodiment of the instant invention seen in FIG. 5, a seal assembly 110 comprises a primary sealing element 112, a secondary sealing element 114, and a pair of back up rings 116 and 118. The secondary sealing element 114 is of T-shaped cross section defined by a stem portion 120 and axially oppositely extending flange portions 122 and 124. The primary sealing element 112 has an axial length that is greater than the axial length of the stem portion 120 of the secondary sealing element 114 thereby to define a pair of locking shoulders 126 and 128 which cooperate with shoulders 130 and 132 on the back up rings 116 and 118, respectively, to lock the back up rings 116 and 118 in the gland 24 of the piston 20.

In the embodiment of the instant invention seen in FIG. 6, a seal assembly 140 comprises a dynamic primary sealing element 142, a static secondary sealing element 144, and a pair of back up rings 146 and 148. The secondary sealing element 144 is of T-shaped cross section defined by a stem portion 150 and axially oppositely extending flange portions 152 and 154. The stem portion 150 of the secondary sealing element 144 has an axial length that is greater than the axial length of the primary sealing element 142 and is provided with a pair of accurate locking shoulders 156 and 158 which cooperate with accurate recesses 160 and 162 on the back up rings 146 and 148, respectively, to lock the back up rings 146 and 148 in the gland 24 of the piston 20. Additionally, accurate recesses 164 and 166 in the stem 150 of the secondary element 144, accept accurate protrusions 170 and 172 on the back up rings 146 and 148, respectively, to augment retention of the back up rings 146 and 148.

The embodiment of the instant invention seen in FIG. 7, comprises a primary sealing element 180, a secondary sealing element 182, and a pair of back up rings 184 and 186. The secondary sealing element 182 is of T-shaped cross section defined by a stem portion 188 and axially oppositely extending flange portions 190 and 192. The primary sealing element 180 has an axial length that is greater than the axial length of the stem portion 188 of the secondary sealing element 182. The stem 188 has a pair of accurate recesses 194 and 196 for the locking acceptance of a pair of protrusions 198 and 200 on the back up rings 184 and 186, respectively.

As seen in FIG. 8, a seal assembly 210 comprises a primary sealing element 212, a secondary sealing element 214, and a pair of back up rings 216 and 218. The secondary sealing element 214 is of T-shaped cross section defined by a stem portion 220 and axially oppositely extending flange portions 222 and 224. The primary sealing element 212 has an axial length that is greater than the axial length of the stem portion 220 of the secondary sealing element 214 thereby to define a pair of locking shoulders 226 and 228 which cooperate with angular shoulders 230 and 232 on the back up rings 216 and 218, respectively, to lock the back up rings 216 and 218 in the gland 24 of the piston 20.

As seen in FIG. 9, a seal assembly 240 comprises a primary sealing element 242, a secondary sealing element 244, and a pair of back up rings 246 and 248. The primary sealing element 242 is notched at each axial end so as to define a pair of locking shoulders 250 and 252 which cooperate with complimentary notches 254 and 256 on the back up rings 246 and 248, respectively, to lock the back up rings 246 and 250 in the gland 24 of the piston 20.

As seen in FIG. 10, a seal assembly 260 comprises a primary sealing element 262, a secondary sealing element 264, and a pair of back up rings 266 and 268. The primary sealing element 262 has accurate ends 270 and 272 that cooperate with complimentary accurate detents 274 and 276 in the back up rings 266 and 268 respectively, to lock the back up rings 266, and 268 in the gland 24 of the piston 20.

In accordance with a three piece embodiment of the instant invention, and as seen in FIG. 11, a seal assembly 280 comprises a dynamic sealing element 282, and a pair of back up rings 284 and 286. The sealing element 282 is of T-shaped cross section defined by a stem portion 288 and axially oppositely extending flange portions 290 and 292. The stem 288 of the sealing element 282 is provided with a pair of arcuate grooves 294 and 296 for the acceptance of complimentary accurate detents 298 and 300 on the back up rings 284 and 286 respectively, to lock the back up rings 284 and 286 in the gland 24 of the piston 20.

In accordance with another three piece embodiment of the instant invention, and as see in FIG. 12, a seal assembly 310 comprises a dynamic sealing element 312 and a pair of back up rings 314 and 316. The sealing element 312 is of T-shaped cross section defined by a stem portion 318 and axially oppositely extending flange portions 320 and 322. Square corners 324 and 326 on the back up rings 314 and 316, respectively, preclude improper assembly thereof with the sealing element 312 due to interference with arcuate section 328 and 330, respectively on the sealing element 312.

I claim:

1. A circular piston seal for acceptance in an annular gland in a piston comprising:

an annular primary sealing element of a first durometer;

a secondary sealing element of a second durometer relatively lower than said first durometer disposed radially inwardly of said primary sealing element and juxtaposed against a radially inner wall of the gland in the piston; and a pair of axially spaced back up rings disposed on opposite sides of said primary sealing element respectively, said back up rings having radially inner portions, respectively, spaced axially from one another a distance less than a maximum axial dimension of said primary sealing element whereby said backup rings are positively locked in the gland of said piston by said primary sealing element.

2. The piston seal of claim 1 wherein said back up rings have convex accurate surfaces intersecting a radially inner face, thereof, respectively, for engagement with complimentary axially spaced concave surfaces, respectively, on said secondary sealing element.

3. The piston seal of claim 1 wherein said back up rings have annular cylindrical shoulders engagable with complimentary cylindrical shoulders on said primary sealing element, respectively.

* * * * *